United States Patent
Bower, III et al.

(10) Patent No.: US 10,872,046 B2
(45) Date of Patent: Dec. 22, 2020

(54) REMOTE POWER CYCLING OF COMPUTING DEVICE VIA NETWORK PACKET

(71) Applicant: Lenovo Enterprise Solutions (Singapore) PTE. LTD., New Tech Park (SG)

(72) Inventors: Fred Allison Bower, III, Durham, NC (US); Caihong Zhang, Shanghai (CN); Christopher Landon Wood, Shanghai (CN)

(73) Assignee: LENOVO Enterprise Solutions (Singapore) PTE. LTD, Singapore (SG)

( * ) Notice: Subject to any disclaimer, the term of this patent is extended or adjusted under 35 U.S.C. 154(b) by 275 days.

(21) Appl. No.: 15/613,245

(22) Filed: Jun. 4, 2017

(65) Prior Publication Data
US 2018/0348848 A1  Dec. 6, 2018

(51) Int. Cl.
| | | |
|---|---|---|
| G06F 1/24 | (2006.01) | |
| G06F 13/24 | (2006.01) | |
| H04L 12/24 | (2006.01) | |
| G06F 1/3209 | (2019.01) | |
| H04L 12/26 | (2006.01) | |

(52) U.S. Cl.
CPC .............. *G06F 13/24* (2013.01); *G06F 1/24* (2013.01); *G06F 1/3209* (2013.01); *H04L 41/24* (2013.01); *H04L 43/08* (2013.01); *H04L 43/10* (2013.01)

(58) Field of Classification Search
CPC ..................................... G06F 1/26; G06F 1/24
See application file for complete search history.

(56) References Cited

U.S. PATENT DOCUMENTS

| | | | | |
|---|---|---|---|---|
| 8,964,396 B1* | 2/2015 | Dailey | ................ | H05K 7/1492 312/223.2 |
| 2001/0005894 A1* | 6/2001 | Fukui | ....................... | G06F 1/26 713/310 |
| 2009/0158097 A1* | 6/2009 | Chen | .................. | G06F 11/2294 714/46 |

(Continued)

OTHER PUBLICATIONS

CISCO, "Catalyst 6500 Release 12.2SX Software Configuration Guide", Jul. 6, 2016.*

(Continued)

*Primary Examiner* — Kim Huynh
*Assistant Examiner* — Eric Chang
(74) *Attorney, Agent, or Firm* — Kunzler Bean & Adamson; Bruce R. Needham

(57) ABSTRACT

Network hardware of a computing device receives a network packet over a network to which the network hardware is connected. The network hardware determines that the network packet includes a power-cycling command. The network hardware, in response to determining that the network packet includes the power-cycling command, triggers a physical line between the network hardware and a power supply of the computing device. The power supply is connected to a power source and currently provides power from the power source to the computing device. In response to the network hardware triggering the physical line, the power supply interrupts providing the power to the computing device for a length of time to cause the computing device to restart and cold reboot.

24 Claims, 7 Drawing Sheets

(56) References Cited

U.S. PATENT DOCUMENTS

2011/0195792 A1* 8/2011 Wells ..................... G07F 9/026
463/43

OTHER PUBLICATIONS

"SMPS Power Supply for ATX Computers", Computer Power Supply, online <http://www.smpspowersupply.com/power-supply.html> accessed Feb. 16, 2017, copyright 2011-2013 Lazar Rozenblat, 3 pp.

"Writing: Software, technology, sysadmin war stories, and more", online <https://rachelbythebay.com/w/2012/03/21/reboot)>, Mar. 21, 2012, 2 pages.

"Wake-on-LAN", online https://en.wikipedia.org/wik/Wake-on-LAN?oldid=755978337, Dec. 21, 2016, 7 pp.

WakeOnLAN (WOL), online <https://wiki.wireshark.org/WakeOnLAN>, last edited Nov. 3, 2014, 2 pp.

"Generating the Wake on Lan Magic Packet", online <http://wiki.tcl.tk/15423>, Feb. 6, 2006, last updated May 20 2014, 2 pp.

\* cited by examiner

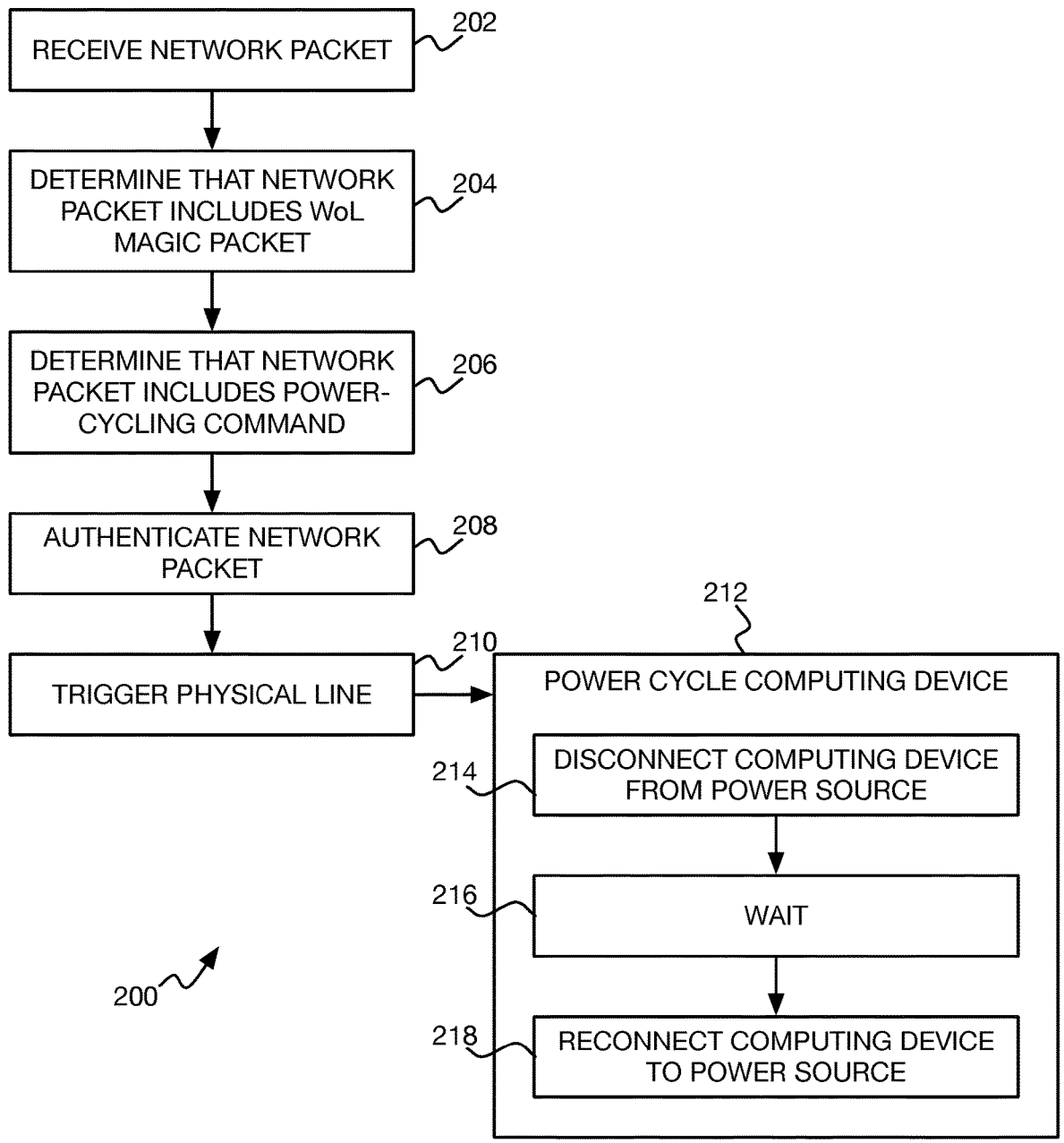

US 10,872,046 B2

REMOTE POWER CYCLING OF COMPUTING DEVICE VIA NETWORK PACKET

BACKGROUND

Entities like corporations and other organizations generally manage or have managed for them a large number of computing devices, such as servers. The servers may be disposed at a central location, like a data center, in which there are hundreds, thousands, or even more servers organized over multiple racks. Therefore, most management of the servers occurs remotely. That is, appropriate personnel usually log onto the computing devices over a network from a location other than the location at which the servers are physically present. This can reduce management costs, as well as ensure physical security of the computing devices.

SUMMARY

An example method includes method receiving, by network hardware of a computing device, a network packet over a network to which the network hardware is connected. The method includes determining, by the network hardware, that the network packet includes a power-cycling command. The method includes, in response to determining that the network packet includes the power-cycling command, triggering, by the network hardware, a physical line between the network hardware and a power supply of the computing device. The power supply is connected to a power source and currently provides power from the power source to the computing device. The method includes, in response to the network hardware triggering the physical line, interrupting, by the power supply, providing the power to the computing device for a length of time to cause the computing device to restart and cold reboot.

An example power supply for a computing device includes a power source interface to connect to a power source that provides power. The power supply includes a computing device interface to connect to the computing device to provide the power to the computing device, and a power-cycling interface to connect to a physical line of the computing device that is triggerable. The power supply includes circuitry to temporarily interrupt the power from the power source interface to the computing device interface responsive to triggering of the physical line.

An example non-transitory computer-readable data storage medium stores computer-executable code that network hardware of a computing device executes. The network hardware executes the code to receive a network packet over a network to which the network hardware is connected. The network hardware executes the code to detect that the network packet includes a power-cycling command. The network hardware executes the code to, responsive to detection of the power-cycling command within the network packet, trigger a physical line between the network hardware and a power supply of the computing device currently providing power from a power source to the computing device. The power supply responsive to triggering of the physical line temporarily interrupts power to the computing device to restart and cold reboot the computing device.

An example computing device includes a housing. The computing device includes a primary logic board disposed within the housing and on which a primary processor and memory are disposed, and a power supply disposed within the housing to provide power from a power source external to the housing to the primary logic board. The computing device includes a physical line having a first end connected to the power supply. The computing device includes network hardware disposed within the housing and to which a second end of the physical line is connected. The network hardware is connectable to a network over which the network hardware is to receive a network packet including a power-cycling command. The network hardware is to trigger the physical line responsive to detection of the power-cycling command within the network packet. The power supply is to cycle the power provided to the primary logic board responsive to the network hardware triggering of the physical line.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a flowchart of a method for power cycling a computing device via a network packet.

DETAILED DESCRIPTION

Figure 1:
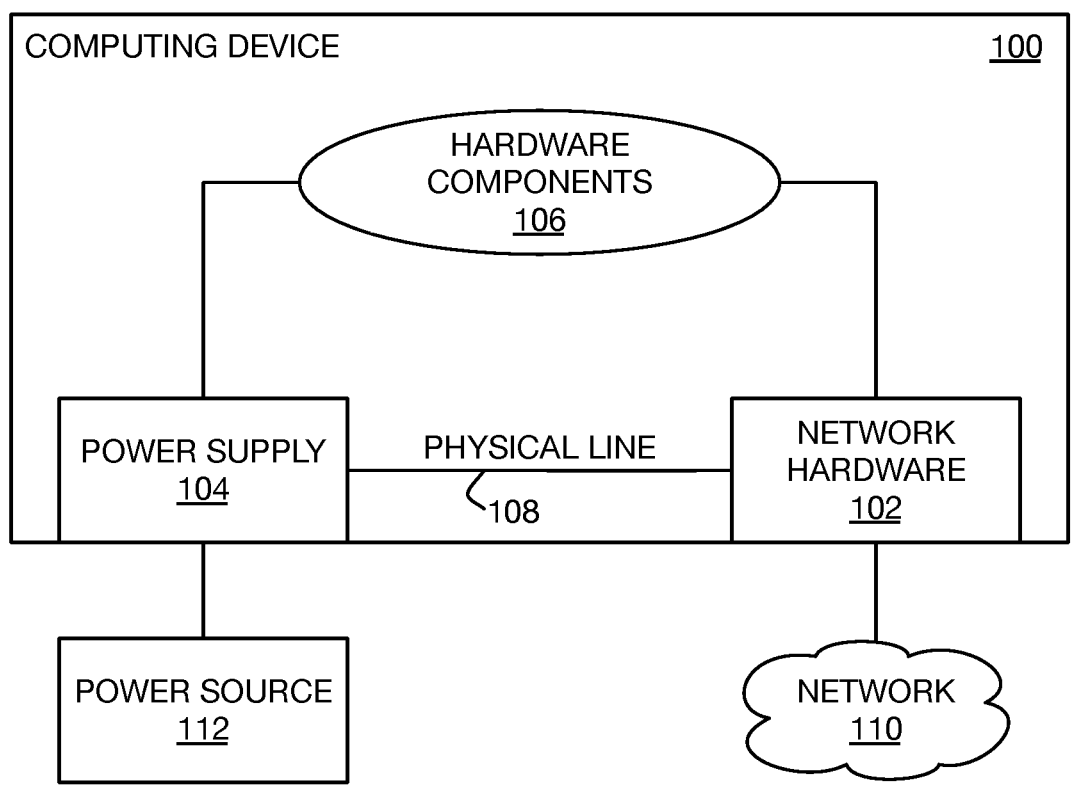
FIG. 1 is a diagram of an example computing device that can be remotely power cycled via a network packet.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, computing devices like servers are often centrally located in locations remote to the locations of the personnel that manage the servers. A computing device like a server typically has a mainboard on which at least a processor and memory are installed to run processing tasks assigned to the server. The processing tasks may run in conjunction with an operating system. Even the most well configured server may occasionally become unresponsive, due to an unforeseen error causing the operating system to "lock up" and not respond to any input. In such cases, the server may have to be rebooted.

To permit remotely attended manual as well as unattended automatic rebooting of a computing device like a server, the server may include a sideboard in addition to the mainboard, such as a baseboard management controller (BMC), integrated management module (IMM), or service processor (SP). The sideboard can include its own processor and memory, apart from that of the mainboard, and does not participate in performing the processing tasks that are the primary tasks assigned to the mainboard. Rather, a user can log into the sideboard remotely to initiate rebooting of the server (i.e., rebooting of the mainboard). The sideboard may also have "watchdog" functionality by which if it detects that the mainboard is unresponsive, or fails to receive a "heartbeat" from the mainboard, then the sideboard automatically reboots the server.

Therefore, in many instances a computing device like a server can be rebooted remotely, without necessitating a user to locally power cycle the server by locally turning the server off and then back on, or by locally removing and then reapplying power to the server. However, even a server having a sideboard may still be unable to be remotely rebooted. For instance, the sideboard itself may also become unresponsive, so that remotely attended manual initiation of rebooting of the server is not possible. In such a case, the sideboard may not be performing its watchdog functionality, or if it is, the watchdog functionality may erroneously conclude that rebooting of the server is unnecessary.

In such cases, presently the only alternative is to dispatch service personnel to the location of the computing device, and locally power cycle the server to perform a cold reboot of the server. If the server requires local power cycling outside of business hours, however, there may not be personnel readily available at the location to power cycle the server. A server may be located at a place that is not regularly attended by personnel, requiring a special trip by a user to visit the server just to power cycle the computing device. In these types of situations, the time and cost to perform a cold reboot of the server can be unduly excessive.

Disclosed herein are techniques that mitigate this issue. A server or other computing device can have network hardware that is integrated on a logic board of the server, or that is disposed on a separate network adapter card inserted into a corresponding slot of the logic board. The network hardware may have wake-on-local area network (WoL) functionality. WoL is a networking standard that permits a computing device to be turned on, or awoken, by a network message. Thus, even when a server is otherwise powered off, a small amount of power is maintained to the network hardware, for the network hardware to perform WoL.

When a computing device like a server is otherwise powered off other than the network hardware receiving a small amount of power to perform WoL, the network hardware does not send or receive network packets on a network to which the hardware is connected as it does when server is powered on. Rather, the network hardware just listens on the network for what is known as a WoL magic packet. The magic packet is a special type of broadcast network packet that may be broadcast to all the network nodes on a network (or all the network nodes of a specific subnet of the network), and which is easily detectable with a minimum amount of circuitry, and thus with minimum power usage. When the magic packet as well as the address of the server is detected, the network hardware powers on the server of which it is a part.

Techniques disclosed herein leverage the WoL magic packet in a different manner. Even when a computing device like a server is powered on, the network hardware of the server continues to inspect received network packets for the magic packet. When the network hardware detects a magic packet, the network hardware also determines whether a power-cycling command is present. Upon detection of the magic packet and the power-cycling command within a network packet, the network hardware triggers a discrete physical line between the network hardware and the power supply of the server. Triggering of the physical line causes the power supply to power cycle the server, by temporarily removing power from the server. As such, the computing device is cold rebooted.

An existing computing device, like a server, can be upgraded to utilize the techniques disclosed herein, without replacing the mainboard or sideboard (if present) thereof. For instance, the power supply and the network card of a server may just be replaced, where a physical line in the form of a separate cable interconnects the power supply to the network card. The network card is programmed to—even when the server is powered on—detect a network packet including the WoL magic packet and a power-cycling command, and responsively trigger the physical line. The power supply has circuitry to responsively power cycle the server.

As such, the techniques disclosed herein permit a standalone server having its own power supply to be remotely power cycled, even when the other avenues by which the server may be able to be remotely rebooted are unavailable. Expensive intelligent power distribution units (iPDUs) that manage the power for a number of servers, and which may require significant infrastructure investment, are unnecessary. WoL functionality is thus leveraged in a novel manner, since the WoL magic packet is employed even though the server is already powered on (i.e., has already been "awoken").

FIG. 1 shows an example computing device 100. The computing device 100 may be a server, or other standalone computer. The computing device 100 includes network hardware 102, a power supply 104, as well as other hardware components 106, such as a mainboard including a processor and memory, a sideboard including its own processor and memory, storage devices, and so on.

The network hardware 102 may be a discrete network adapter card or a network integrated circuit (IC) integrated within the mainboard of the computing device 100. The network hardware 102 connects the computing device 100 to a network 110. For example, the network hardware 102 can include a network jack into which one end of a network cable is inserted, where the other end of the cable is connected to a network switch or other network device that is part of the network 110. The network 110 can thus be or include an Ethernet network, a local-area network (LAN), a wide-area network (WAN), an intranet, an extranet, the Internet, and so on. The network hardware 102 can receive network packets from the network 110 that are then transmitted to the hardware components 106, such as to the processor of the mainboard or the sideboard on which an operating system is running. The network hardware 102 can likewise transmit network packets onto the network 110 on behalf of the hardware components 106.

The power supply 104 is part of the computing device 100, and provides power to the hardware components 106, including the network hardware 102. The power supply 104 thus is connected to a power source 112, such as an alternating current (AC) mains power source. For example, a power cord may have one end connected to the power supply 104, and another end connected to an electrical outlet like a wall outlet of a building, of an uninterruptible power supply (UPS) that is itself connected to a wall outlet, a surge suppression or line conditioning device that is itself connected to a wall outlet, and so on. In general, the power supply 104 may convert AC power provided by the power source 112 to direct current (DC) power that the hardware components 106 use.

A discrete physical line 108 directly connects the network hardware 102 to the power supply 104. The discrete physical line 108 may be in the form of a cable, or a conductive trace on a circuit board of the computing device 100, such as the mainboard or the sideboard of the computing device 100.

The physical line 108 may be a single conductive wire that can be normally connected to power and pulled down to ground or normally connected to ground and pulled up to power. The physical line 108 may be multiple conductive wires by which messages can be transmitted between the network hardware 102 and the power supply 104.

In operation, the network hardware 102 receives a network packet that includes a power-cycling command. The network hardware 102 itself detects the power-cycling command within the network packet, as opposed to passing the network packet to the other hardware components 106 that detect the power-cycling command. As noted above, the network packet may include a WoL magic packet of the type that the network hardware 102 detects when the computing device 100, other than the network hardware 102, is powered off. That is, the network packet may include a WoL magic packet of the type that the network hardware 102 detects when the hardware components 106 are powered off and the computing device 100 is not performing any processing tasks, including when the operating system of the computing device 100 has been shut down. In this implementation, the network hardware 102 can already have circuitry to detect a WoL magic packet, and upon detection of the WoL magic packet within a network packet, additionally detects whether the power-cycling command is present.

Upon detection of the power-cycling command within a network packet, the network hardware 102 triggers the physical line 108 that directly connects the network hardware 102 to the power supply 104. The network hardware 102 may pull the physical line 108 to ground if the physical line 108 is normally connected to power, or may pull the physical line 108 to power if the physical line 108 is normally connected to ground. In another implementation, the network hardware 108 may send a message over the physical line 108 to the power supply 104 indicative of receipt of the power-cycling command by the network hardware 108.

Responsive to triggering of the physical line 108 by the network hardware 102, the power supply 104 power cycles the computing device 100. For example, the power supply 104 may temporarily disconnect power from the power source 112 to the hardware components 106 of the computing device 100, including to the network hardware 102, before reconnecting this power. As another example, the power supply 104 may temporarily disconnect the computing device 100 from the power source 112 to the computing device 100 as a whole. The power supply 104 may have a small battery, such as a capacitor, that permits the power supply 104 to remain powered for a brief length of time, so that the power supply 104 can then reconnect the power source 112 to the computing device 100.

The effect of power cycling the computing device 100 can be that the computing device 100 is cold restarted. The operating system running on the mainboard of the computing device 100 is thus cold rebooted. Therefore, even if the computing device 100 is unresponsive, including if the sideboard of the computing device 100 is unresponsive, the computing device 100 can be remotely restarted. The network hardware 102 does not rely on any hardware components 106 to detect the power-cycling command within a network packet received on the network 110, and does not rely on any hardware components 106 to trigger the physical line 108. Likewise, the power supply 104 does not rely on any hardware components 106 to detect triggering of the physical line 108, and does not rely on any hardware components 106 to power cycle the computing device 100. Built-in WoL magic packet detection capability of the network hardware 102 that permits the network hardware 102 to power on (the hardware components 106 of) the computing device 100 when the device 100 is powered off thus can be leveraged to also permit the network hardware 102 cause power cycling of the computing device 100 when the device 100 is on, by triggering the physical line 108.

FIG. 2 shows an example method 200 by which the computing device 100 is powered cycle responsive to a network packet including a power-cycling command being received. Parts of the method 200 in the left column of FIG. 2 are performed by the network hardware 102. For instance, the network hardware 102 can include a processor and a non-transitory computer-readable data storage medium that stores instructions that the processor executes to perform these parts of the method 200. Parts of the method 200 in the right column of FIG. 2 are performed by the power supply 104. For instance, the power supply 104 can include circuitry, including an application-specific integrated circuit (ASIC) or a field-programmable gate array (FPGA), to perform these parts of the method 200.

While the computing device 100 is powered on, the network hardware 102 receives a network packet 202 that is sent over the network 110 (202). The network packet 202 may be a broadcast or a multicast network packet that is broadcast to all the devices, including the computing device 100, on the same network, or the same subnet of the network. The network packet can be received as a user datagram protocol (UDP) datagram, such as at port 0, 7, or 9, as opposed to a transmittal control protocol (TCP) packet. The network packet can be received over an Ethernet network as Ethernet frame of a specified EtherType, such as EtherType 0x0842.

Responsive to receiving the network packet, the network hardware 102 can determine whether the network packet includes a WoL magic packet (204). A WoL magic packet is a broadcast frame that contains anywhere within its payload six bytes of all 255 (FF FF FF FF FF FF in hexadecimal), followed by sixteen repetitions of the 48-bit destination media access control (MAC) address of the magic packet, for a total of 102 bytes. Therefore, the network hardware 102 determines that the network packet includes a WoL magic packet by scanning the network packet for six bytes of all 255, followed by the MAC address of the network hardware 102. The network hardware 102 does not have a full protocol stack, and does not otherwise parse the received network packet.

In one implementation, although a WoL magic packet per protocol can be included in any type of network packet, just one of two types of network packets received in part 202 are inspected for a WoL magic packet in part 204. That is, in this implementation, it is determined whether a received network packet is one of two types of network packets in part 202, and the inspection in part 204 is performed just if the network packet is one of these two types. The first type is that the network packet is a UDP data program received at a particular port, such as port 0, 7, or 9. The second type is that the network packet has an Ethernet frame of a specified EtherType, such as EtherType 0x0842 noted above.

In response to determining that the network packet includes a WoL magic packet (addressed to the network hardware 102), the network hardware 102 determines that the network packet includes a power-cycling command (206). The power-cycling command can be included in the WoL magic packet itself, or in the network packet subsequent to the WoL magic packet. In the former case, the WoL magic packet can have an optional password field of four or six bytes. This password field can be novelly employed to include a command of a specified four- or six-byte signature that corresponds a power-cycling command. In the latter instance, at the conclusion of the WoL magic packet, a signature of a specified number of bytes corresponding to a power-cycling command can be appended within the network packet. As noted above, the network hardware 102 may not implement a full protocol stack, and therefore the network hardware 102 simply scans the WoL magic packet (or the network packet starting at the point after the WoL magic packet) for the power-cycling command.

In response to determining that the network packet includes the power-cycling command, the network hardware 102 can also authenticate the network packet (208). For instance, the network hardware 102 can authenticate the sender of the network packet. The WoL magic packet itself includes, besides the MAC address of the network hardware 102 as the destination of the magic packet, the MAC address of the device that sent the magic packet. Therefore, in one implementation, sender authentication of the network packet can be performed by verifying the MAC address against a table of approved MAC addresses from which received power-cycling commands will be acted upon to power cycle the computing device 100. The MAC address may be masked prior to matching, so that a stored MAC address pattern can successfully match the MAC address of more than one sender. In this respect, the last one or more bytes may be masked, and just a specified first number of bytes within the MAC address matched.

The network hardware 102 can authenticate the network packet in other ways as well. For instance, a security signature within the network packet may be verified. The security signature may be a digital signature of an asymmetric digital signature pair of which the other digital signature is maintained at the network hardware 102. Therefore, the network hardware 102 can match the received digital signature against the digital signature it maintains. The security signature may be received within the four- or six-byte password field of the WoL magic packet, in addition to or instead of the power-cycling command itself. The security signature may be appended to the WoL magic packet within the network packet, instead of being stored in the password field of the WoL magic packet. Because the network hardware 102 may not implement a full protocol stack, the network hardware 102 may simply scan the WoL magic packet (or the network packet itself) for the security signature.

In response to successfully authenticating the network packet, the network hardware 102 triggers the physical line 108 directly connecting the network hardware 102 to the power supply 104 (210). Triggering of the physical line 108 is thus said to be performed responsive to determining that the network packet includes the power-cycling command, where this determination may be made just if the network packet includes a WoL magic packet, and where this determination can have a further condition that the network packet including the power-cycling command has to be authenticated. Triggering of the physical line 108 corresponds to the network hardware 102 sending a direct message to the network hardware 102 to power cycle the computing device 100 that is currently providing power to the hardware components 106 of the device 100.

Responsive to the physical line 108 being triggered by the network hardware 102, the power supply 104 power cycles the computing device 100 (212). The power supply 104 thus temporarily interrupts power to the computing device 100 to restart and cold reboot the device 100. In one implementation, this can therefore include disconnecting the computing device 100 from the power source 112 (214), waiting a specified length of time (216), and when this length of time has elapsed, reconnecting the computing device 100 to the power source 112 (218). The computing device 100 is configured to automatically start and boot when power is applied to the device 100, so that reconnection of the power source 112 to the computing device 100 results in restarting and cold rebooting of the device 100.

Figure 3A:
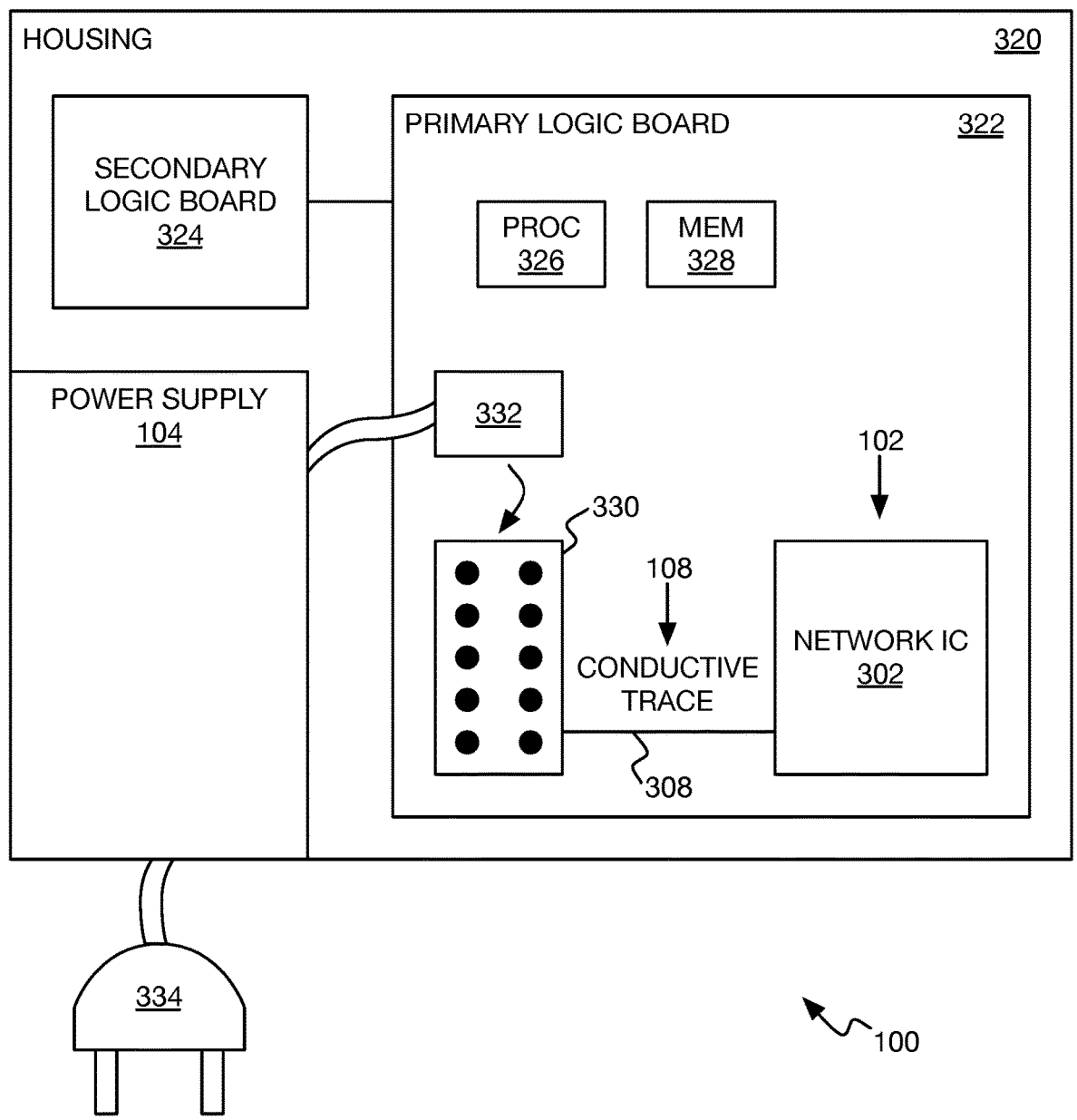
FIGS. 3A, 3B, and 3C are diagrams of example computing devices that can be power cycled via network packets.
Figure 3B:
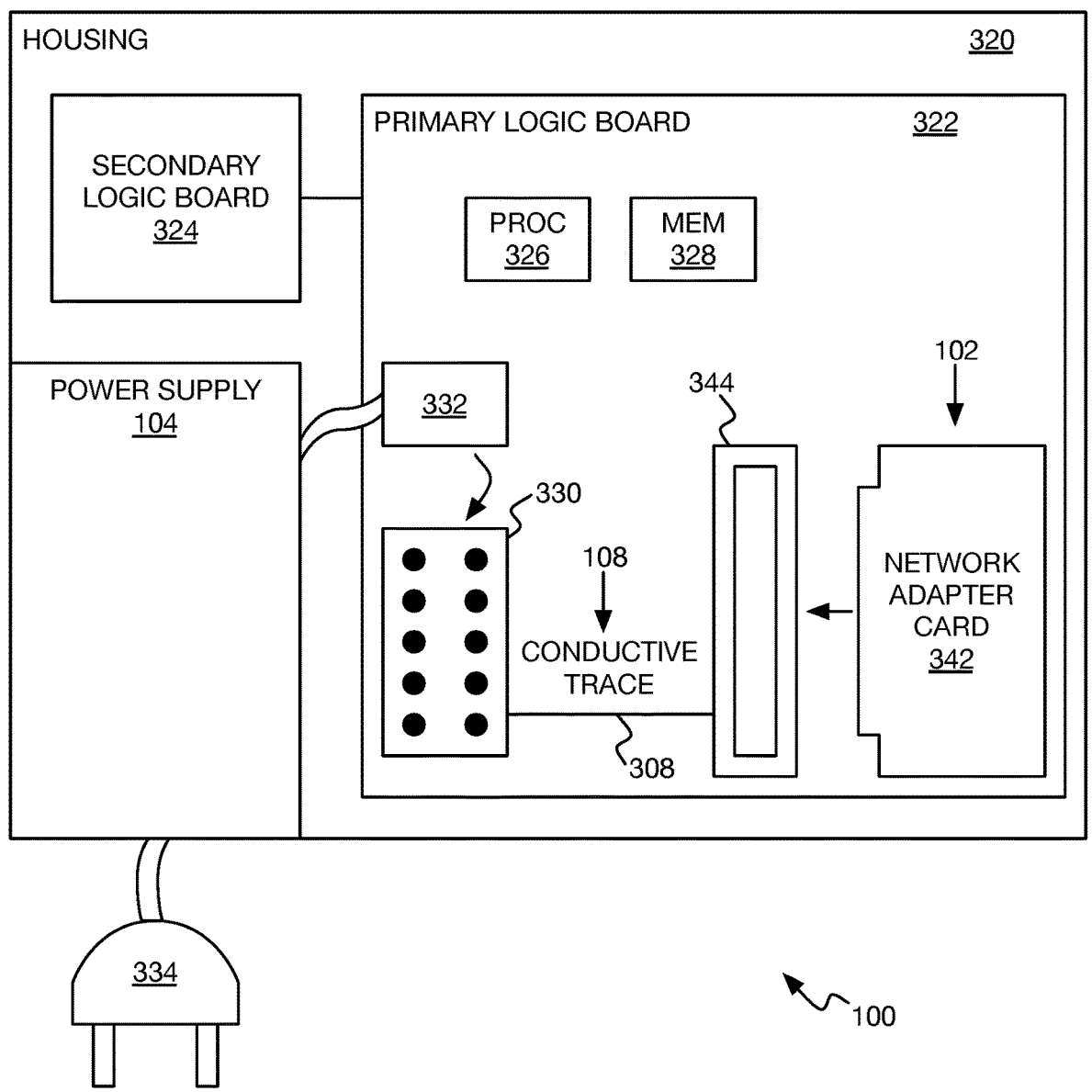
Figure 3C:
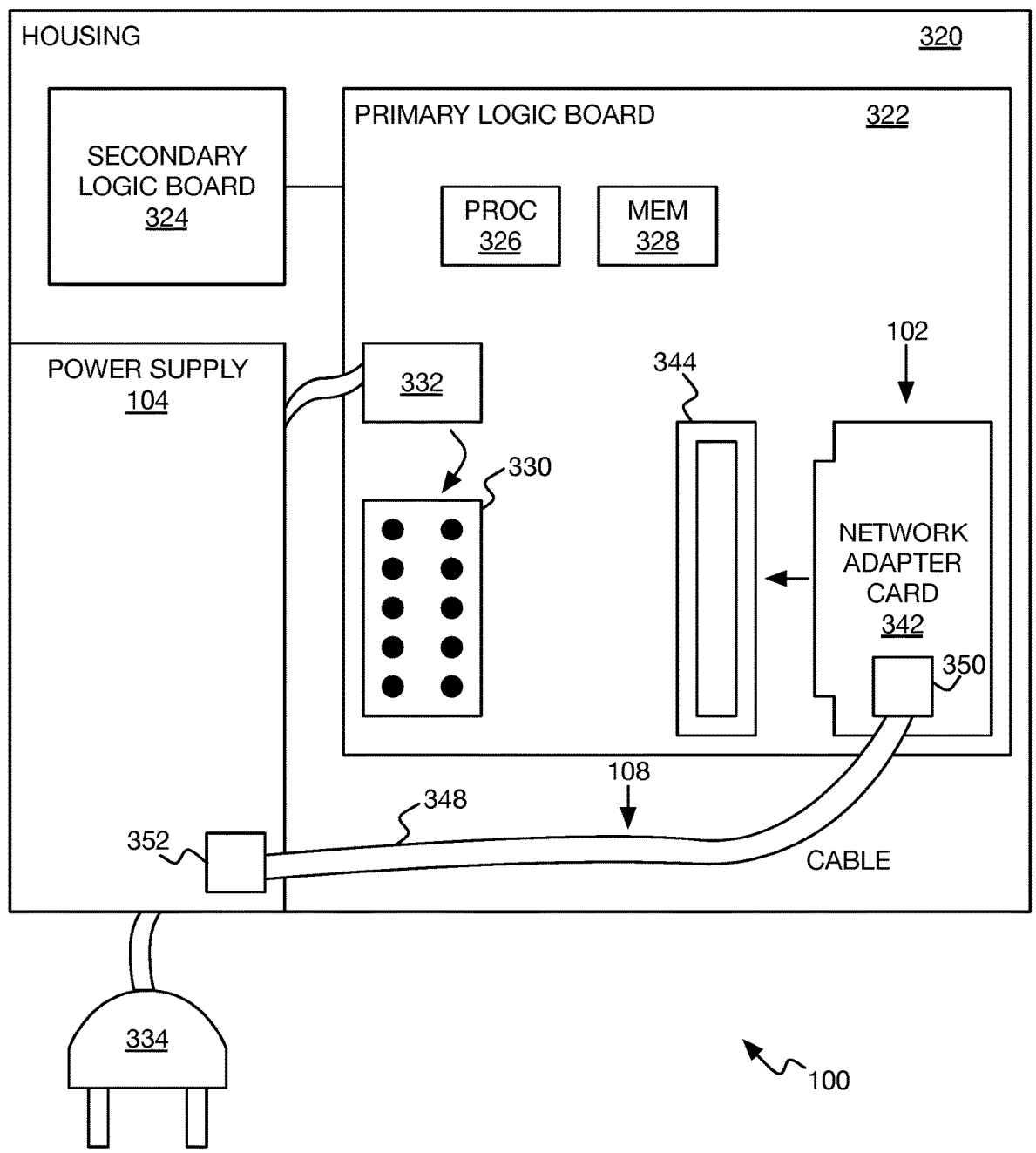

FIGS. 3A, 3B, and 3C show different examples of the computing device 100. The computing device 100 of FIG. 3A includes a housing 320 in which the power supply 104 and a primary logic board 322 are disposed. The primary logic board 322 includes a primary processor 326 and primary memory 328, among other hardware components, which may perform the primary processing tasks of the computing device 100. For instance, an operating system may be executed using the components of the primary logic board 322, in conjunction with which application programs are then run to perform the primary processing tasks.

The computing device 100 can also include a secondary logic board 324, which may implement a BMC (i.e., an IMM or SP) that can be separately accessed and which performs out-of-band management functionality with respect to the primary logic board 322. The secondary logic board 324 can be inserted into a corresponding slot of the primary logic board 322, or may have a cable ending in a connector that is mated with a corresponding connector of the primary logic board 322. The secondary logic board 324 is also disposed within the housing 320 of the computing device 100.

In FIG. 3A, the network hardware 102 is implemented as a network IC 302 disposed on the primary logic board 322. The network IC 302 may be soldered onto the primary logic board 322, or may be removably inserted into an IC socket soldered onto the primary logic board 322. The network IC 302 is thus disposed within the housing 320 insofar as the primary logic board 322 on which it is a part is disposed within the housing 320.

In FIG. 3A, the physical line 108 is implemented as a conductive trace 308 on the primary logic board 322. One end of the conductive trace 308 terminates at the network IC 302, such as at a pin of the network IC 302. Another end of the conductive trace 308 terminates at a connector 330 attached to (i.e., soldered on) the primary logic board 322, such as at a pin of the connector 330. The power supply 104 has a corresponding connector 332 that mates with the connector 330 of the primary logic board 322.

The conductive trace 308 thus directly connects the power supply 104 to the network IC 302. The connector 330 permits the power supply 104 to provide power to the primary logic board 322, via the connector 332 of the power supply 104. Since the connector 330 is directly connected to the conductive trace 308, this means that the power supply 104 is directly connected to the conductive trace 308 once the connector 332 is mated to the connector 330.

The power supply 104 also has a connector 334 to connect the power supply 104 to a power source. In the example of FIG. 3A, for instance, the connector 334 is the form of an AC plug that can be inserted into an AC receptacle, such as a wall outlet. The power supply 104 thus receives power via the connector 334, and in turn provides power to the primary logic board 322 of the computing device 100. The primary logic board 322, its constituent components, and the secondary logic board 324 may be considered the components 106 of FIG. 1. The power supply 104 may have another connector to connect to the secondary logic board 324 (as well as certain components of the primary logic board 322), or the secondary logic board 324 may receive power from the power supply 104 via the primary logic board 322.

In FIG. 3B, the computing device 100 again includes the housing 320 in which the power supply 104 and the primary logic board 322 are disposed. The primary logic board 322 includes the primary processor 326 and the primary memory 328 as in FIG. 3A. The computing device 100 can include the secondary logic board 324 in FIG. 3B. The power supply 104 has the connector 334 to connect the power supply 104 to a power source in FIG. 3B, as in FIG. 3A.

The network hardware 102 in FIG. 3A is implemented as a network adapter card 342, which can also be referred to as a network interface card (NIC). The network adapter card 342 is removably inserted into a corresponding slot 344 of the primary logic board 322. The network adapter card 342 is disposed within the housing 320 when inserted into the slot 344.

The physical line 108 is implemented as the conductive trace 308 on the primary logic board 322 in FIG. 3B. One end of the conductive trace 308 terminates at the slot 344, such as at a conductive pin thereof, and another end of the conductive trace 308 terminates at the connector 330 to which the corresponding connector 332 of the power supply 104 is mated. The conductive trace 308 thus directly connects the power supply 104 to the network adapter card 342. Since the connector 330 is directly connected to the conductive trace 308, the power supply 104 is directly connected to the conductive trace 308 once the connector 332 is mated to the connector 330. Likewise, since the slot 344 is directly connected to the conductive trace 308, the network adapter card 342 is directly connected to the conductive trace once the card 342 is inserted into the slot 344.

Therefore, a difference between the computing device 100 in FIG. 3A and the computing device 100 in FIG. 3B is that in the former figure, the network hardware 102 is implemented as a network IC 302 that can be permanently attached to the primary logic board 322. By comparison, in the latter figure, the network hardware 102 is implemented as a network adapter card 342 that is removably inserted into a corresponding slot on the primary logic board 322. However, in both FIGS. 3A and 3B, the physical line 108 is implemented as a conductive trace on the primary logic board 322. The physical line 108 in both figures directly connects the power supply 104 to the network hardware 102.

In FIG. 3C, the computing device 100 also again includes the housing 320 in which the power supply 104 and the primary logic board 322 are disposed. The primary logic board 322 includes the primary processor 326 and the primary memory 328 as in FIGS. 3A and 3B. The computing device 300 can include the secondary logic board 324 in FIG. 3C. The power supply 104 has the connector 334 to connect the power supply 104 to a power source in FIG. 3C, as in FIGS. 3A and 3B. The network hardware 102 in FIG. 3C is implemented as a network adapter card 342 that is removably inserted into the corresponding slot 344 of the primary logic board 322.

The physical line 108 is implemented as a separate cable 348 in FIG. 3C. A connector 350 terminating one end of the cable 348 connects the cable 348 to the network adapter card 342. A connector 352 terminating the other end of the cable 348 connects the cable 348 to the power supply 104. The cable 348 thus directly connects the power supply 104 to the network adapter card 342.

Therefore, a difference between the computing device 100 in FIG. 3B and the computing device 100 in FIG. 3C is that in the former figure, the physical line 108 is implemented as a conductive trace 308 on the primary logic board 322, whereas in the latter figure, the physical line is implemented as a separate cable 348. Implementing the physical line 108 as a separate cable 348 can permit a power supply 104 and a network adapter card 342 that have been adapted to the techniques described herein to be used in conjunction with a primary logic board 322 that may not have. For instance, the logic board 322 may not have a conductive trace 308 to directly connect the network hardware 102 to the power supply 104, and the connector 330 and the slot 344 may not support a separate pin of each being dedicated to connection to such a conductive trace 308. Therefore, the usage of a separate cable 348 to directly connect the power supply 104 and the network adapter card 342 permits the network adapter card 342 (as the network hardware 102) to trigger the physical line 108 so that the power supply 104 responsively power cycles the computing device 100.

Figure 4A:
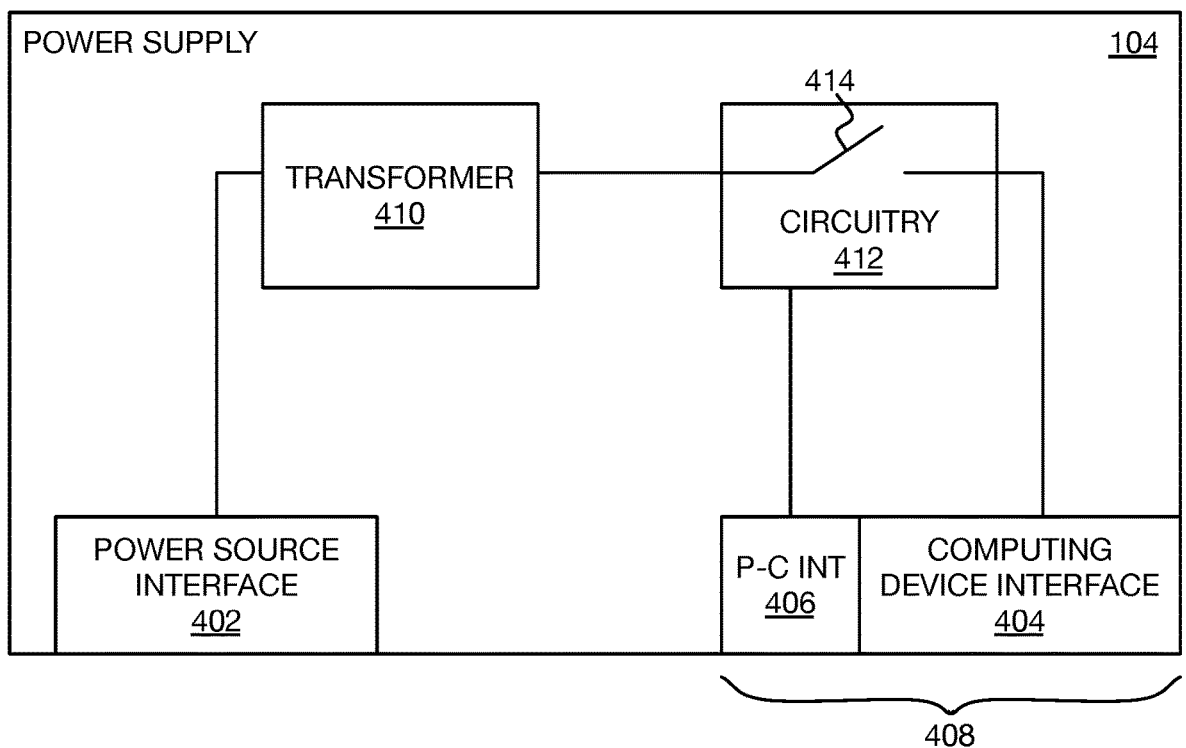
FIGS. 4A and 4B are diagrams of example power supplies that can power cycle the computing devices of which they are a part.
Figure 4B:
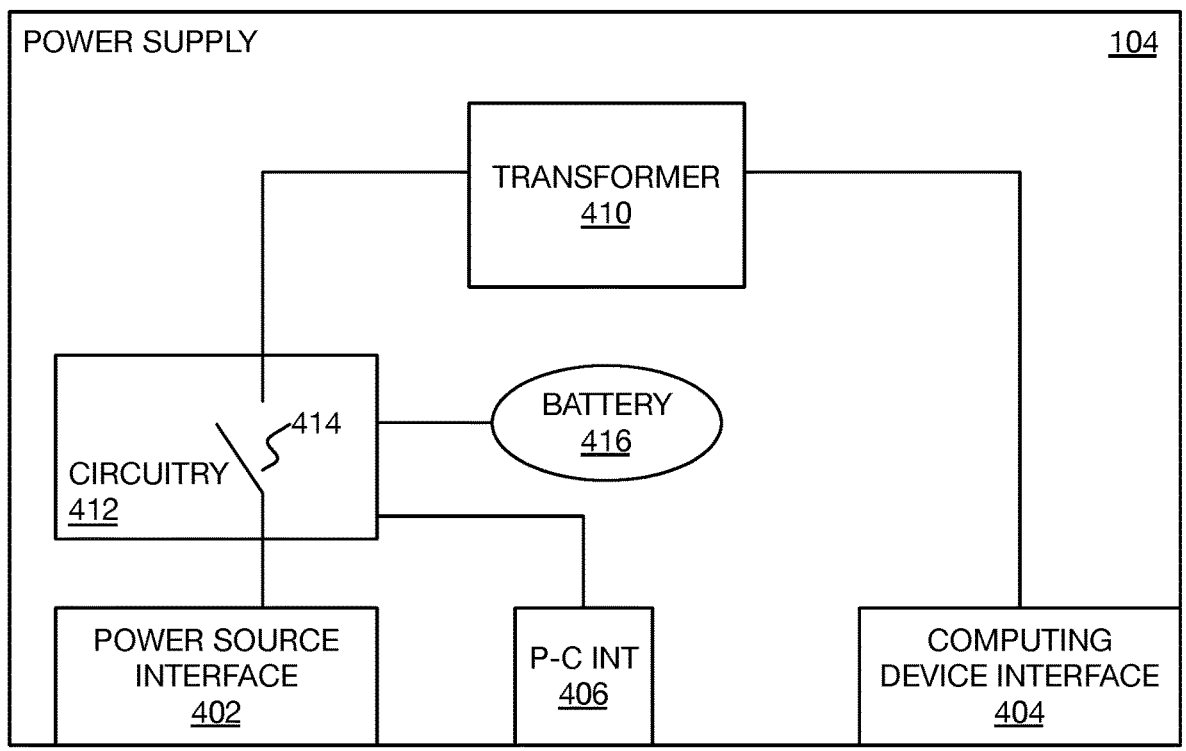

FIGS. 4A and 4B show different examples of the power supply 104. The power supply 104 of FIG. 4A includes a power source interface 402 to connect the power supply 104 to a power source, like an AC mains power source. The power source interface 402 may be a cable terminator in the connector of FIGS. 3A, 3B, and 3C, for instance, or the power source interface 402 may be receptive to such a cable.

The power supply 104 of FIG. 4A includes a computing device interface 404 and a power-cycling interface 406 integrated within a single interface 408. The computing device interface 404 connects the power supply 104 to a computing device 100, such as to the primary logic board 322 of FIGS. 3A, 3B, and 3C, to provide power to the computing device 100. The power-cycling interface 406 connects the power supply 104 to the physical line 108 that has been described, such as the conductive trace 308 of FIGS. 3A and 3B. The single interface 408 may be the connector 332 of FIGS. 3A and 3B.

The power supply 104 of FIG. 4A includes a transformer 410, which converts the AC mains power provided by the power source at a first voltage, such as nominally 120 or 230 volts, to direct current (DC) power at a second voltage lower than the first voltage, such as 12 volts. The power supply 104 includes circuitry 412 that may have a normally closed switch 414. The switch 414 is normally closed to provide the DC power output by the transformer 410 to the computing device 100 via the computing device interface 404. However, responsive to triggering of the physical line 108 by the network hardware 102, the circuitry 412 temporarily opens the switch 414 to temporarily interrupt the DC power provided to the computing device 100. The circuitry 412 itself still receives the DC power (that is, the transformer 410 continues to provide the DC power), which permits the circuitry 412 to remain powered while the switch 414 is temporarily open. In this way, the circuitry 412 can power cycle the computing device 100 within which the power supply 104 has been installed.

In FIG. 4B, the power supply 104 includes the power source interface 402, the computing device interface 404, and the power-cycling interface 406. However, in FIG. 4B, the computing device interface 404 and the power-cycling interface 406 are separate from one another. For instance, the computing device interface 404 may be the connector 332 of FIG. 3C, and the power-cycling interface 406 may be a connector to which the connector 352 of the cable 348 that implements the power line 108 in FIG. 3C.

The power supply 104 of FIG. 4B includes the transformer and the circuitry 412 that may have the normally closed switch 414. The switch 414 is normally closed to provide the AC mains power to the transformer 410, which converts the AC mains power to the DC power provided to the computing device 100 via the computing device interface 404. Responsive to triggering of the physical line 108 by the network hardware 102, the circuit 412 temporarily opens the switch 414 to temporarily interrupt the AC mains power provided to the transformer 410, and thus the DC power provided to the computing device 100.

Because the transformer 410 does not continue to provide the DC power when the switch 414 is opened, the power supply 104 includes a battery 416, such as a capacitor, that can provide power to the circuitry 412. This permits the circuitry 412 to remain powered while the switch 414 is opened, so that the circuitry 412 can subsequently close the switch to restart and reboot the computing device 100 (and thus power cycle the computing device 100). The battery 416 may be recharged by the DC power provided by the transformer 410.

Two differences between the power supply 104 in FIG. 4A and the power supply 104 in FIG. 4B include the side of the transformer 410 at which the circuitry 412 is located and thus at which the circuitry 412 performs switching, and whether the interfaces 404 and 406 are integrated or separate. In FIG. 4A, the circuitry 412 is located at the DC power side of the transformer 410 and thus switches the DC power output by the transformer 410 on and off, and the interfaces 404 and 406 are integrated within a single interface 408, such as a single connector. In FIG. 4B, the circuitry 412 is located at the AC power side of the transformer 410 and thus switches the AC power input to the transformer 410 on and off, and the interfaces 404 and 406 are separate. In other implementations, the circuitry 412 can be located at the DC power side of the transformer 410 as in FIG. 4A and the interfaces 404 and 406 can be separate as in FIG. 4B, or the circuitry 412 can be located at the AC power side of the transformer 410 as in FIG. 4B and the interfaces 404 and 406 can be integrated as in FIG. 4A.

The techniques that have been described thus permit a computing device like a server or a computer that may have its own separate and built-in power supply to be remotely powered cycled via receipt of a network packet. The techniques can leverage WoL magic packets that are conventionally employed when a computing device is off, as opposed to when a computing device is on. The network interface of a computing device can trigger a physical line connecting the network interface to the power supply, and circuitry of the power supply can responsively power cycle the computing device. When the physical line is a separate cable that connects the network interface to the power supply, the techniques described herein can be employed to retrofit an existing computing device by replacing the existing power supply and network interface (e.g., network adapter card), with a power supply and a network interface as has been described herein.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
receiving and sending, by a network hardware disposed within a housing of a computing device, a plurality of data network packets for primary processing tasks of the computing device, wherein the computing device is a general purpose computing device;
receiving, by the network hardware, a command network packet comprising a power-cycling command;
in response to determining that the command network packet includes the power-cycling command, triggering, by the network hardware, a physical line internally connecting the network hardware to a power supply that is disposed within the housing of the computing device and is currently providing direct current ("DC") power to the computing device from a power source; and
in response to the network hardware triggering the physical line, interrupting, by the power supply, providing the power to the computing device for a length of time to cause the computing device to restart and cold reboot, wherein the physical line controls a switch disposed within a housing of the power supply.

2. The method of claim 1, wherein the method further comprises:
after receiving the command network packet, determining, by the network hardware, that the command network packet comprises a wake-on-local area network (WoL) magic packet,
wherein determining that the command network packet includes the power-cycling command is performed responsive to determining that the command network packet contains the WoL magic packet.

3. The method of claim 1, wherein the method further comprises:
in response to determining that the command network packet includes the power-cycling command, authenticating, by the network hardware, a sender of the command network packet,
wherein triggering the physical line between the network hardware and the power supply is performed responsive to successfully authenticating the sender of the command network packet.

4. The method of claim 1, wherein triggering the physical line between the network hardware and the power supply comprises pulling the physical line from power to ground or from ground to power for a length of time.

5. The method of claim 1, wherein triggering the physical line between the network hardware and the power supply comprises sending a message corresponding to the power-cycling command over the physical line.

6. The method of claim 1, wherein interrupting providing the power to the computing device for the length of time comprises:
disconnecting the computing device from the power source;
after disconnecting the computing device from the power source, waiting a length of time; and
after the length of time has elapsed, reconnecting the computing device to the power source.

7. A non-transitory computer-readable data storage medium storing computer-executable code configured to be executed by a network hardware disposed within a housing of a computing device to perform operations comprising:
receiving and sending, a plurality of data network packets for primary processing tasks of the computing device, wherein the computing device is a general purpose computing device;

receiving a command network packet comprising a power-cycling command; and responsive to detection of the power-cycling command within the command network packet, trigger a physical line internally connecting the network hardware and a power supply that is disposed within the housing of the computing device and currently providing direct current ("DC") power to the computing device from a power source, wherein the triggering of the physical line is configured to instruct the power supply to temporarily interrupt power to the computing device to restart and cold reboot the computing device, wherein the physical line controls a switch disposed within a housing of the power supply.

8. The non-transitory computer-readable data storage medium of claim 7, wherein the computer-executable code is further executable by the network hardware to:

after receiving the network packet, detect that the network packet includes a wake-on-local area network (WoL) magic packet;

wherein the network hardware is to execute the code to detect that the network packet includes the power-cycling command responsive to detection of the WoL magic packet within the network packet.

9. The non-transitory computer-readable data storage medium of claim 8, wherein the computer-executable code is further executable by the network hardware to:

responsive to detection of the power-cycling command within the network packet, verify a security signature of the network packet, wherein the network hardware is to execute the code to trigger the physical line responsive to successful verification of the security signature within the network packet.

10. A computing device comprising:

a housing;

a primary logic board disposed within the housing and on which a primary processor and memory are disposed to run an operating system and an application program to perform primary processing tasks of the computing device, wherein the computing device is a general purpose computing device;

a power supply disposed within the housing to provide direct current ("DC") power from a power source external to the housing to the primary logic board;

a physical line disposed within the housing having a first end internally connected to the power supply within the housing; and network hardware disposed within the housing and to which a second end of the physical line is internally connected within the housing, the network hardware connectable to a network over which the network hardware is configured to receive a network packet including a power-cycling command, the network hardware configured to trigger the physical line responsive to detection of the power-cycling command within the network packet, the primary processor to send and receive packets over the network using the network hardware while the primary processor is running an operating system and an application program to perform primary processing tasks of the computing device, wherein the power supply is configured to cycle the power provided to the primary logic board responsive to the network hardware triggering a switch disposed in the housing of the power supply connected to the physical line.

11. The computing device of claim 10, wherein the network hardware is to detect that the network packet includes a wake-on-local area network (WoL) magic packet, and is to detect that the network packet includes the power-cycling command responsive to detection of the WoL magic packet within the network packet.

12. The computing device of claim 11, wherein the network hardware is to verify a security signature of the network packet responsive to detection of the power-cycling command within the network packet, and is to trigger the physical line responsive to successful verification of the security signature within the network packet.

13. The computing device of claim 10, wherein the physical line is a conductive trace on the primary logic board, the first end of the physical line ending in a connector to which the power supply is connected.

14. The computing device of claim 13, wherein the network hardware comprises a network integrated circuit (IC) disposed on the primary logic board, the second end of the physical line terminating on the primary logic board at the network IC.

15. The computing device of claim 13, wherein the network hardware comprises a network adapter card inserted into a slot attached to the primary logic board, the second end of the physical line terminating at the slot.

16. The computing device of claim 10, wherein the physical line is a separate cable, the first end of the physical line ending in a first connector coupled to the power supply, the second end of the physical line ending in a second connector coupled to the network hardware.

17. The computing device of claim 10, further comprising:

a secondary logic board disposed within the housing and to connect to the primary logic board to implement a baseboard management controller (BMC) of the primary logic board.

18. A network hardware, comprising:

a network interface configured to send and receive packets over a network, wherein the network interface is disposed within a housing of a computing device, the computing device is a general purpose computing device;

a data interface configured to communicate with hardware components on a primary logic board of the computing device;

a trigger interface configured to connect to a power supply disposed within a housing of the computing device, the power supply is configured to provide direct current ("DC") power to the primary logic board; and a controller that is configured to perform operations comprising:

receiving and sending, a plurality of data network packets for primary processing tasks of the computing device;

receiving a command network packet comprising a power-cycling command; and responsive to detection of the power-cycling command within the command network packet, trigger a physical line internally connecting the network hardware and the power supply via the trigger interface, wherein the triggering of the physical line is configured to instruct a switch disposed within a housing of the power supply to temporarily interrupt power to the computing device to restart and cold reboot the computing device.

19. The network hardware of claim 18, wherein the power source converts alternating current (AC) power to direct current (DC) power at a DC interface, wherein the DC interface of the power supply provides power to the hardware components and the network hardware.

20. The network hardware of claim 18, wherein the power supply comprises a power-cycling interface that is triggerable over a physical line between the trigger interface of the network hardware and the power-cycling interface to temporarily interrupt power to the hardware components in response to the controller triggering the physical line.

21. The network hardware of claim 18, further comprising:

a rechargeable battery that is recharged by the DC power from the transformer, and that is configured to power circuitry in the power supply, wherein the circuitry is configured to temporarily interrupt power to the hardware components responsive to the triggering of the physical line.

22. The network hardware of claim 18, wherein circuitry configured to temporarily interrupt power to the hardware components responsive to the triggering of the physical line comprises:

a normally closed switch that normally permits the power from the power source to be provided to the computing device, wherein the circuitry temporarily opens the normally closed switch responsive to the triggering of the physical line.

23. The network hardware of claim 18, wherein detecting the power-cycling command within the command network packet further comprises determining, by the controller, that the command network packet comprises a wake-on-local area network (WoL) magic packet, wherein triggering the physical line is responsive to determining that the command network packet includes the WoL magic packet.

24. The network hardware of claim 18, wherein responsive to detection of the power-cycling command within the command network packet, the controller is further configured to authenticate a sender of the command network packet, and wherein triggering the physical line between the network hardware and the power supply is performed responsive to detection of the power-cycling command within the command network packet and successfully authenticating the sender of the command network packet.

* * * * *